(12) United States Patent
Connelly et al.

(10) Patent No.: US 9,602,309 B2
(45) Date of Patent: Mar. 21, 2017

(54) ALERT MESSAGE PORTAL TO SECURELY NOTIFY SUBSCRIBERS OF EVENTS

(75) Inventors: Lisa M. Connelly, Lisle, IL (US); Jacob Hillis, Aurora, IL (US); Subhashish Ghosh, Naperville, IL (US); Hawnli Nian, Wheaton, IL (US); Anne Y. Lee, Naperville, IL (US); Ma-Lung Chung, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 1722 days.

(21) Appl. No.: 13/017,455

(22) Filed: Jan. 31, 2011

(65) Prior Publication Data
US 2012/0195325 A1    Aug. 2, 2012

(51) Int. Cl.
*H04J 3/26* (2006.01)
*H04L 12/58* (2006.01)
*H04L 12/18* (2006.01)
*H04L 29/08* (2006.01)

(52) U.S. Cl.
CPC .......... *H04L 12/5855* (2013.01); *H04L 51/14* (2013.01); *H04L 12/1895* (2013.01); *H04L 12/588* (2013.01); *H04L 67/306* (2013.01)

(58) Field of Classification Search
CPC combination set(s) only.
See application file for complete search history.

(56) References Cited

U.S. PATENT DOCUMENTS

| | | | |
|---|---|---|---|
| 2003/0020623 A1* | 1/2003 | Cao et al. | 340/686.6 |
| 2009/0131088 A1* | 5/2009 | Kirchmeier et al. | 455/466 |
| 2009/0191870 A1* | 7/2009 | Siegel et al. | 455/435.1 |
| 2010/0146057 A1* | 6/2010 | Abu-Hakima et al. | 709/206 |
| 2012/0071129 A1* | 3/2012 | Haney | 455/404.2 |
| 2012/0190325 A1* | 7/2012 | Abu-Hakima et al. | 455/404.2 |
| 2013/0035055 A1* | 2/2013 | Kirchmeier et al. | 455/404.1 |
| 2013/0157609 A1* | 6/2013 | Vainik et al. | 455/404.1 |

OTHER PUBLICATIONS

Alcatel-Lucent OmniAccess8550; Web Services Gateway/ Release 3.2/ Portal Reference Guide Oct. 2010.

* cited by examiner

*Primary Examiner* — Jung-Jen Liu
(74) *Attorney, Agent, or Firm* — Davidson Sheehan LLP

(57) ABSTRACT

The present invention provides a method of operating a communication portal. One embodiment of the method includes accessing, at the communication portal, an alert message addressed to a group registered to receive an alert service. The method also includes generating user identifiers corresponding to users that are registered to the group. The user identifiers are assigned to the users for use within the communication portal. The method further includes transmitting the alert message from the communication portal to the users indicated by the user identifiers.

22 Claims, 6 Drawing Sheets

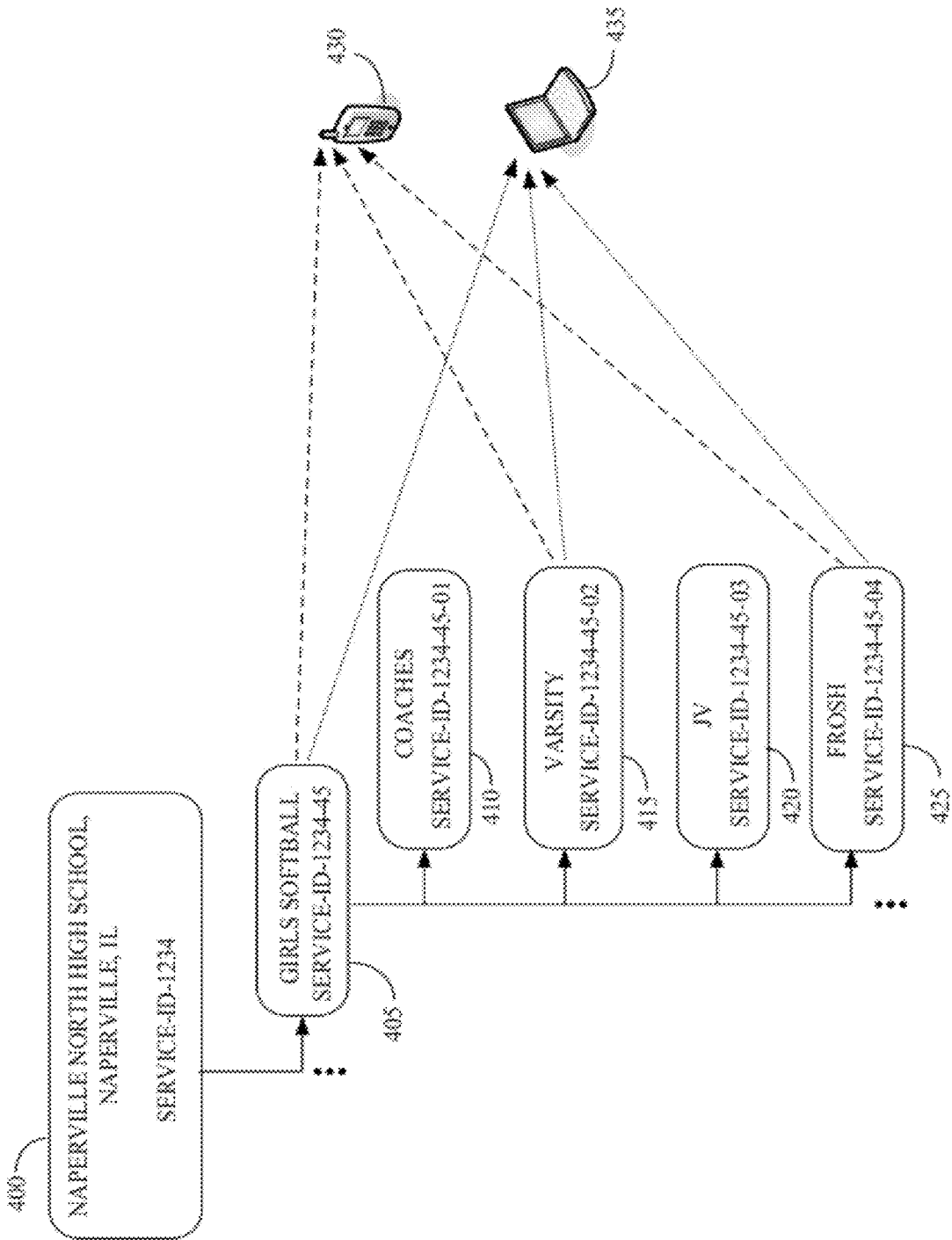

ALERT MESSAGE PORTAL TO SECURELY NOTIFY SUBSCRIBERS OF EVENTS

BACKGROUND OF THE INVENTION

1. Field of the Invention

This invention relates generally to communication systems, and, more particularly, to providing alerts in communication systems.

2. Description of the Related Art

A ubiquitous Internet, pervasive wireless coverage, and the inexorable decline in the cost (and increase in the capabilities) of communication devices has led to an explosion in the volume of messages exchanged between people and organizations. Although this has generally been a boon to society, there are a number of well-known drawbacks to completely free and open communication. One is the sheer volume of messages that an individual may send and receive in the course of the day. Another is the number of unsolicited (and usually unwanted) messages that can be received, e.g., as spam from legitimate and illegitimate sources.

One example of a valuable service is an alert service. Users can subscribe or register to alert services so that they receive alerts on their cell phones, smart phones, laptops, home computers, and the like. The alerts can be used to notify the users of weather conditions, traffic conditions, scheduling changes, or practically any other event. However, users may not appreciate receiving a large number of alerts, particularly if they are associated with events that do not concern or interest the user. The number of alerts may also be multiplied if copies are sent to different addresses, identifiers, or numbers associated with the same user, such as e-mail addresses, instant messaging handles, and phone numbers. Users may also be reluctant to provide contact information to third-party service providers out of fear that this information will be used to target the user for spam or sold to other providers.

Third-party service providers may also have difficulty directing alerts to the appropriate subscribers. For example, parents of the students at a particular high school may want to receive alerts associated with high school events. However, not all parents may want to receive all of the alerts for all of the events at the high school. Parents of athletes may want to be informed of scheduling changes related to their children's teams, but may not want to receive alerts associated with other teams or other extracurricular activities. However, parents of all the students may want to be informed of school closures. Third-party service providers may also want to provide assurances that the subscribers to their services will not become the targets of unwanted spam.

SUMMARY OF EMBODIMENTS OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for operating a communication portal. One embodiment of the method includes accessing, at the communication portal, an alert message addressed to a group registered to receive an alert service. The method also includes generating user identifiers corresponding to users that are registered to the group. The user identifiers are assigned to the users for use within the communication portal. The method further includes transmitting the alert message from the communication portal to the users indicated by the user identifiers.

In another embodiment, a method is provided for operating a communication device. One embodiment of this method includes receiving, at the communication device and from a communication portal, an alert message provided by an alert service. The communication device is a registered member of a group that receives an alert service and the communication device is identified to the group by a username. The communication portal has assigned a user identifier to a user of the communication device for use within the communication portal and the communication portal transmits the alert message to the communication device based on the user identifier.

In yet another embodiment, a method is provided for operating a first communication device. One embodiment of the method includes providing an alert message from the first communication device and to a communication portal. The alert message is directed to users that are members of a group that receives an alert service and the users are identified to the group by a username. The communication portal has assigned a user identifier to a user of a second communication device for use within the communication portal so that the user identifier is not visible outside the communication portal. The communication portal transmits the alert message to the second communication device based on the user identifier.

BRIEF DESCRIPTION OF THE DRAWINGS

The disclosed subject matter may be understood by reference to the following description taken in conjunction with the accompanying drawings, in which like reference numerals identify like elements, and in which:

FIG. 4 conceptually illustrates one exemplary embodiment of an alert message service that can be provided to subscribers associated with the Naperville North High School.

Figure 1:
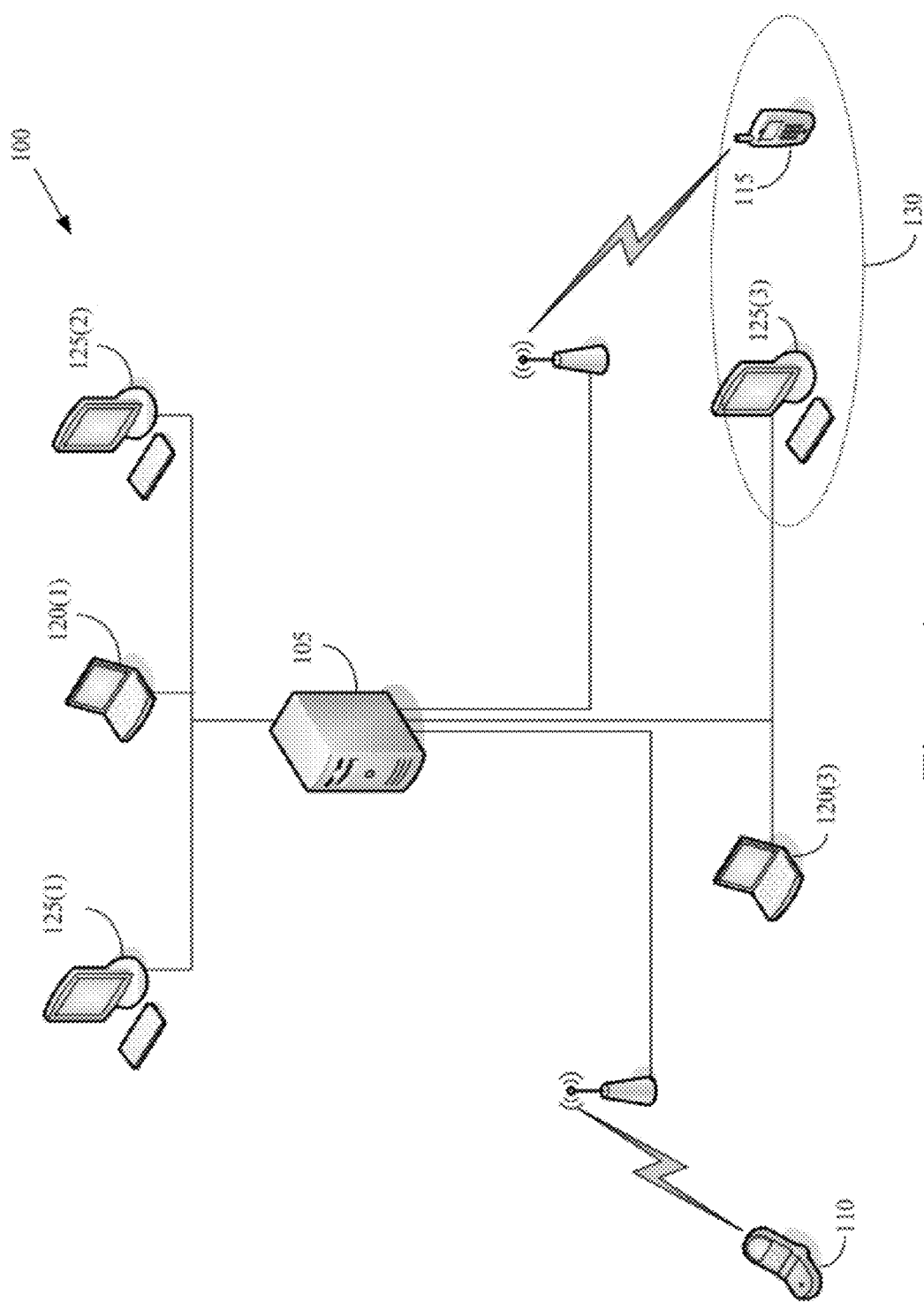
FIG. 1 conceptually illustrates a first exemplary embodiment of a communication system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present application describes embodiments of techniques for implementing and operating a communication portal that is used to support alert services that provide alert messages to subscribers and/or registered users. The communication portal can therefore be referred to as an alerting portal, an alert services portal, a smart alerting portal, or other term. The portal can receive, access, parse, and process alert messages and service requests that are received from alert service providers. For example, alert messages may be addressed to a group of users that are registered to receive the alert service. From the perspective of the service provider, the groups are identified by service and/or group identifiers and the users are identified by usernames, which may be selected by the users. However, the usernames and/or group names are not addresses and do not include sufficient information to send messages to the users. The portal may therefore assign an internal user identifier to users that can be used to access user addresses, thereby shielding and/or concealing the user's identity/address from the service provider so that the service provider cannot bypass the portal and transmit messages (such as spam) directly to the users using information such as the user name that is visible to the service provider. When the communication portal receives an alert message addressed to a group and/or username, the portal may generate user identifiers corresponding to the user names that are associated with the group that is receiving the alert message. The alert message can then be transmitted from the communication portal to users indicated by the user identifiers.

In some embodiments, the communication portal may use a user profile database to store user preference information for each user. Third-party service providers can therefore send manually generated or machine generated alerts to subscribers registered to receive the alerts based on the subscribers' alerting preferences. This may simplify the alerting process from the perspective of the third-party because the alert service provider does not have to know details about the subscriber or details about the user's preferred alerting methods, e.g., short message service (SMS) alerting, multimedia instant messaging (MMIM), audio alerts, e-mail messages, and the like. Subscribers can also use the communication portal to configure the alerting services and the method of receiving an alert and/or the type of device that is used to receive the alert, e.g., each user may specify whether the alert should be received on a cell phone, a plain old telephone service (POTS) phone, a session initiation protocol (SIP) phone, on multiple phones, at an e-mail address, and the like.

FIG. 1 conceptually illustrates a first exemplary embodiment of a communication system 100. In the first exemplary embodiment, the communication system 100 supports wired and wireless communication with various users. Although the communication links depicted in FIG. 1 are shown as direct connections between the various devices, persons of ordinary skill in the art having benefit of the present disclosure should appreciate that in practice the communication pathways travel over wired and/or wireless networks that include numerous individual communication connections, as well as devices such as switches, routers, hubs, servers, and the like. In the interest of clarity, these elements of the communication system 100 are not depicted in FIG. 1. Persons of ordinary skill in the art having benefit of the present disclosure should also appreciate that signals or messages conveyed by the communication system 100 may be created, transmitted, and/or received according to well known communication protocols including protocols established by the Third Generation Partnership Project (3GPP, 3GPP2), the Telecommunications and Internet-converged Services and Protocols for Advanced Networking (TISPAN) standards body, and the like.

A communications portal 105 is implemented in the communication system 100 to support alert messaging services. In the illustrated embodiment, users can access the communications portal 105 using any of a variety of communication devices including, but not limited to, mobile phones 110, smart phones 115, laptops 120, desktop computers 125, tablet devices, and the like. Users can register with the communications portal 105 to provide alert messaging services, receive alert messages for subscribed services, or any combination thereof. For example, users of the desktop computers 125(1-2) and the laptop computer 120(1) may register with the communications portal 105 to provide alert messaging services. For another example, users of the cell phone 110, the smart phone 115, the laptop computer 120(3), and the desktop computer 125(3) may register to receive alert messages provided by one or more of the alert messaging services. For yet another example, the user of the desktop computer 125(3) may also register to provide one or more alert services so that the user is both a provider and a receiver of alert services. A single user can register multiple communication devices with the communications portal 105, e.g., the smart phone 115 and the desktop computer 125(3) may be owned and registered by the same user, as indicated by the dashed oval 130.

Figure 2:
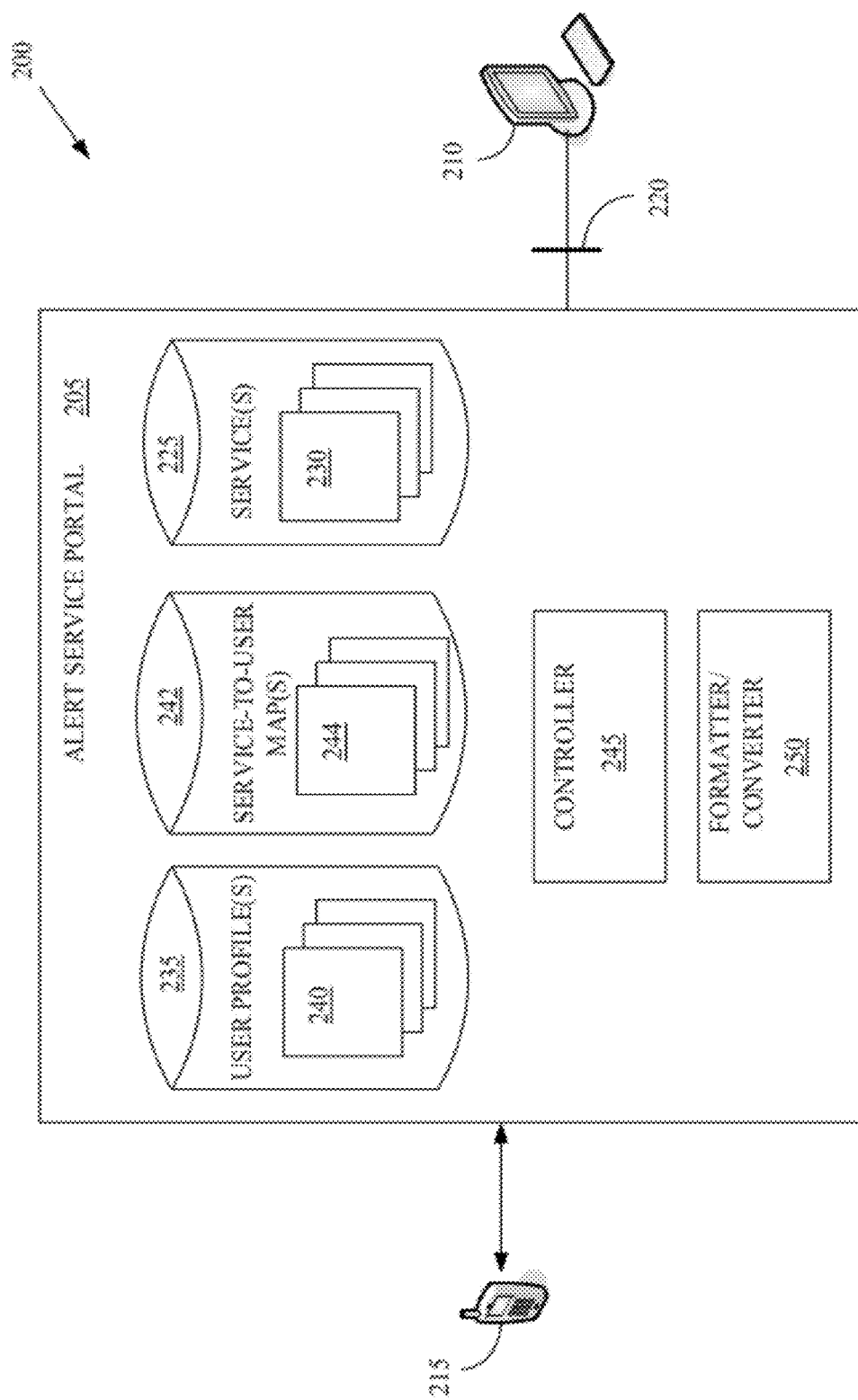
FIG. 2 conceptually illustrates a second exemplary embodiment of a communication system.

FIG. 2 conceptually illustrates a second exemplary embodiment of a communication system 200. The second exemplary embodiment includes an alert service portal 205 that is used to support alert messaging services provided by a service provider 210. The alert messaging services can be used to provide alerts to one or more subscribers 215. In the interest of clarity, a single service provider 210 and a single subscriber 215 are shown in FIG. 2. However, persons of ordinary skill in the art having benefit of the present disclosure should appreciate that the alert service portal 205 may support alert messaging for any number of service providers 210 and/or subscribers 215. In one embodiment, the alert service portal 205 operates according to the Internet protocol (IP) multimedia subsystem (IMS) standards and/or protocols. For example, the alert service portal 205 may implement IMS Application Enablement services. The alert service portal 205 may sit behind a service provider's firewall (not shown in FIG. 2) and may communicate with service providers 210 over an application programming interface (API) 220 such as a RESTful API that operates in accordance with the Representational State Transfer (REST) architecture.

Subscribers 210, 215 may register with the alert services portal 205 to utilize the alert service functionality of the portal 205. Registered subscribers 210, 215 may establish (and potentially modify) a username and password that can be used to authenticate the subscriber 210, 215 for subsequent access to the alert services portal 205. In this way each subscriber 210, 215 may only need to know only one username/password combination to manage their alerting service(s) as well as to manage their subscriptions and user preferences. The alert services portal 205 portal may then assign each subscriber 210, 215 a unique user identifier (UserID) that is only known to the alert services portal 205. The user identifiers are not communicated or visible outside of the alert services portal 205. For example, user identifiers may not be communicated to the subscribers 210, 215 so the subscribers 210, 215 may not be aware of their own user identifier or the user identifiers of any other subscriber. In one embodiment, only the username provided by the subscribers 210, 215 is used to identify the subscribers to each other. The username can be selected so that the user's identity, addresses, handles, and the like cannot be derived or discovered on the basis of the username. Consequently, unwanted or unauthorized messages cannot be conveyed to the subscribers 210, 215 by entities that are only aware of the username. For example, the subscriber 210 cannot bypass the alert service portal 205 to send spam messages to the subscriber 215. The alert service portal 205 may therefore serve as a filter or gatekeeper for alert messages transmitted between the subscribers 210, 215.

Each subscriber 210, 215 may be a sender (senders create services and generate alerts), a receiver (receivers receive alerts), or both. In one embodiment, a subscriber 210, 215 that successfully registers with the alert services portal 205 may be either a sender or a receiver. Alternatively, the alert services portal 205 may support different classes or tiers of registration. For example, different types of subscriptions (which may have different associated fees) may permit a subscriber 210, 215 to be a sender, a receiver, or both. Senders may be asked to enter a unique Service Name for each alerting service that they create. Upon successful registration of the requested service, the alert services portal 205 may create and assign a unique ServiceID to the service. The ServiceID may be made known to the sender, who may also be referred to as the Service Creator (defined as the Administrator for that Service). The Administrator can then create any number of sub-groups for the service which may be assigned unique GroupIDs based on the ServiceID, e.g., a ServiceID of 1234 may have sub-groups with IDs: 1234-23-01, 1234-23-02, 1234-45-01-01, etc. In one embodiment, no limit maybe set on the nesting of either sub-groups or the number of sub-groups for each service.

Services and groups may be public or private. Public services may be listed by the alert services portal 205, e.g., they may be visible to users that log into a webpage supported by the alert services portal 205 or otherwise access information provided by the alert services portal 205. Subscribers 210, 250 may therefore subscribe to any number of available Services/Groups from the list of public Services/Groups listed on or by the alert service portal 205. Private services may be offered or advertised to select users, e.g. by sending the select users e-mail that include links to the private service. Senders may specify whether the offered service is public or private. Subscribers 210, 215 that are registered as receivers may request that the alerts be sent to an address or addresses of various communication devices, e.g., phone number, a SIP URI, an e-mail address, and the like. In one embodiment, the capability of each communication device can be specified. For example, a particular registered communication device may be identified as an audio-only device such as a cell phone, a text-message device such as a cell phone or smartphone, and/or a multimedia device such as a smart phone, laptop, or desktop. Subscribers may also specify time-of-day and/or location preferences for alerts.

In the illustrated embodiment, the alert service portal 205 includes a service database 225 that is used to store information for initiating, implementing, maintaining, and/or operating alert services. The information for each service may be stored in a record or profile 230 that can be indexed by the service name or service identifier. Each profile 230 includes information identifying the service creator (subscriber 215 in this case) and in some cases the users that have subscribed to the service (at least subscriber 210 in this case). For example, a profile 230 may include usernames when the sender has configured the service to provide alert messages to individual users. The profile 230 may also include information identifying and/or defining various subgroups associated with each service or group. This information may also include usernames for the users that have subscribed to each group or subgroup of the service. As discussed herein, users may be identified in the profile 230 only on the basis of their usernames.

Figure 3B:
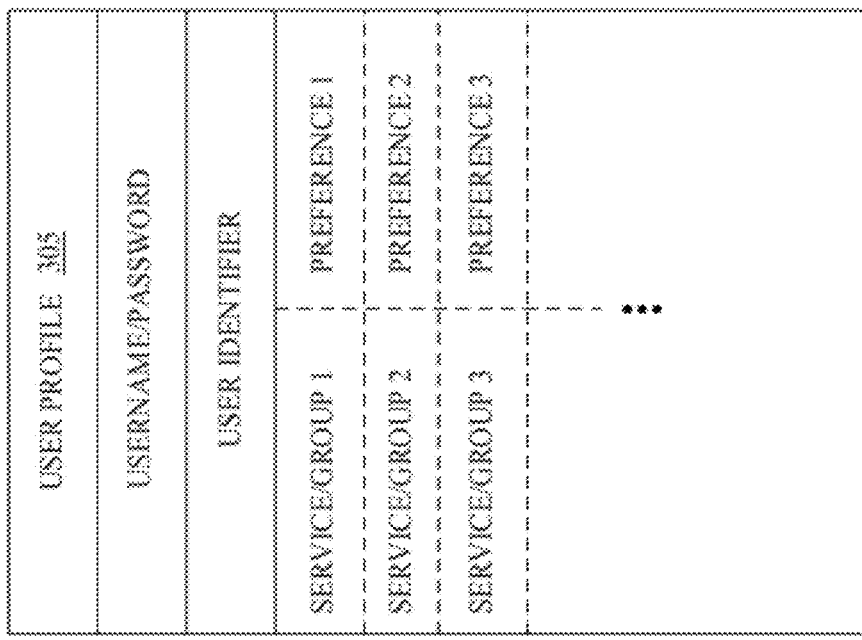
FIG. 3B conceptually illustrates one exemplary embodiment of a user profile.
Figure 3A:
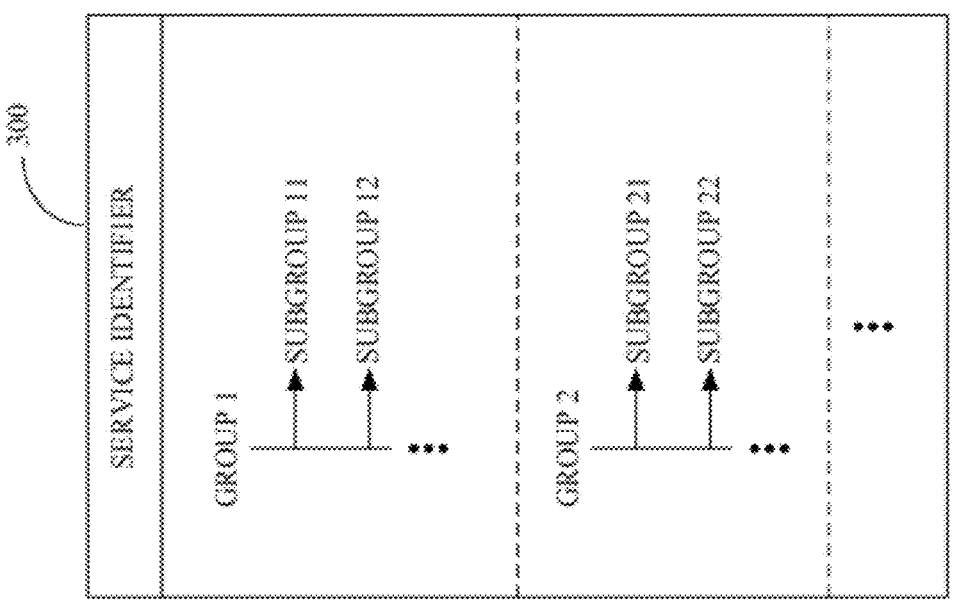
FIG. 3A conceptually illustrates one exemplary embodiment of a service profile.

FIG. 3A conceptually illustrates one exemplary embodiment of a service profile 300. In the illustrated embodiment, the service profile 300 is indexed by a service identifier that can be used to identify the service to the subscribers or to potential subscribers. The service profile 300 includes information indicating different groups (e.g., Group1, Group2, etc.). Each of these groups includes a subset of the users or subscribers so that the service can be used to provide subsets of the alert messages to the users in the particular groups. A sender can then address the alert messages to the appropriate group and the alert service portal can use the group identifier to identify the registered users and transmit the alert message to these users according to their preferences. The groups can be further subdivided into subgroups (e.g., Subgroup11, Subgroup12, Subgroup21, Subgroup22, etc.) so that increasingly specific alert messages can be sent to user subsets having progressively finer granularity. For example, a number of users subscribed to the service indicated by the service identifier may be larger than the number of users that elect to subscribe to one or more of the groups, which may in turn be larger than the number of users that elect to subscribe to any of the subgroups. In one embodiment, the hierarchy of services, groups, subgroups, and the like may or may not be bounded or limited to any particular number of levels.

Referring back to FIG. 2, the alert service portal 205 also includes a user profile database 235 that is used to store information that can be used to address the alerts to communication devices associated with the user, configure the alerts in an appropriate format, and the like. Each user profile may be stored in a record or profile 240 that can be accessed to determine the alert service preferences for each user. Each profile 240 may therefore include the username of the subscriber (such as the subscriber 215), the user identifier that has been defined by the alert service portal 205, services/groups that the user has subscribed to, user preferences for receiving alert messages, and the like.

FIG. 3B conceptually illustrates one exemplary embodiment of a user profile 305. In the illustrated embodiment, the user profile 305 includes a username and a password. For example, each user can select a username and a secret password that can be used to authenticate a user to the alert services portal. The user profile 305 also includes the user identifier that has been assigned to the user by the alert services portal. The user profile 305 may store this information in any format, although in a preferred embodiment user profiles 305 are stored in an encrypted form to provide additional security. As discussed herein, the user identifier is used to identify the user within the alert services portal and is not disclosed to other subscribers. A list of the services and/or groups to which the user has subscribed (e.g., Service/Group 1, Service/Group 2, Service/Group 2, etc.) is included in the user profile 305.

A list of preferences (e.g., Preference1, Preference2, Preference3, etc.) for receiving the alert messages is also included in the user profile 305. In one or more embodiments, the preferences may be applied to particular service/groups or they may be applied to multiple services/groups under various conditions. Exemplary preferences that may be included in the user profile 305 include, but are not limited to, the address or addresses at which to be alerted (e.g., phone number, SIP URI, e-mail), the capability of each device (e.g., audio-only, text-message, multi-media), time-of-day preferences, location preferences, and sender preferences. For example, a user may specify that they want to receive audio-only alerts during business hours at a phone number associated with their office phone. For another example, a user may specify that they want to receive a text message on their smart phone when the location information associated with the smart phone indicates that the user is outside of their home or office. For yet another example, a user may disable all alert messaging to any of their phones between the hours of 10 PM and 5 AM and the user may request that alert messages be sent to an e-mail address as a multimedia message during this time interval. The preferences may also indicate preferences for alert messages associated with different senders. For example, a child of an older parent who resides in an assisted-living facility may request that alert messages sent by the assisted-living facility always be sent to a particular phone number at any time of day or night.

Referring back to FIG. 2, the alert services portal 205 also stores mapping information that indicates the users that have registered to receive each of the services. In one embodiment, the mapping information includes service-to-user maps 244 for each of the services that are offered by registered senders. For example, a map 244 may include an identifier of each service, group, or subgroup that indicates a list of the user identifiers and/or usernames for the users that are registered to receive alert messages that are sent to the corresponding service, group, or subgroup by the sender. The user identifiers may then be used as indexes in to the user records 240 stored in the database 235.

Figure 3C:
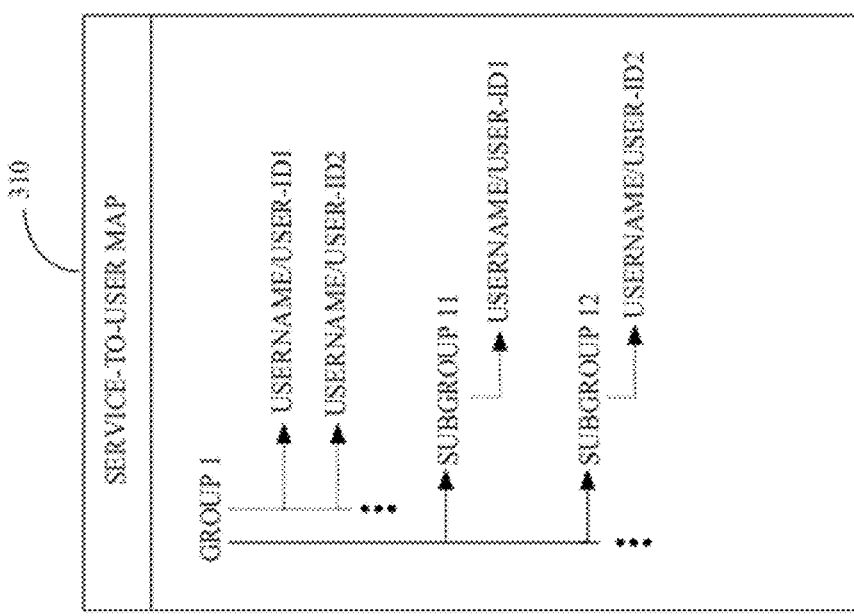
FIG. 3C conceptually illustrates one exemplary embodiment of a service-to-user map database.

FIG. 3C conceptually illustrates one exemplary embodiment of a service-to-user map 310. In the illustrated embodiment, the map 310 includes information (such as pointers) that relates a group (Group1) to the users that are subscribed to this group. For example, the map 310 indicates that at least two users have registered to receive alert messages that are addressed to Group1. The registered users (Username/User-ID1, Username/User-ID2) are indicated by their usernames and user identifiers in the illustrated embodiment. The map 310 may also indicate the subgroups (Subgroup11, Subgroup12) that are associated with the primary group at the top of the group/subgroup hierarchy. The map 310 shown in FIG. 3C indicates that the first user has also registered to receive messages addressed to the first subgroup and the second user has also registered to receive messages addressed to the second subgroup. Persons of ordinary skill in the art having benefit of the present disclosure should appreciate that the map 310 is intended to be illustrative and that alternative embodiments of the map 310 may be used to represent different relations between services, groups, subgroups, users, and the like.

Referring back to FIG. 2, in one embodiment, the alert services portal 205 may implement one or more of the databases 225, 235, 242 as Lightweight Directory Access Protocol (LDAP) databases. For example, the user profile database 235 may be implemented as a LDAP Subscriber Database that contains both security credentials (e.g., username/password) as well as user data (ServiceIDs/GroupIDs, alerting preferences, and a list of subscribed-to services/groups. The alert services portal 205 may therefore support a data query interface with one or more of the databases 225, 235, 242 that operates according to LDAP, which is an application protocol for reading and editing directories over an IP network. A directory is defined as an organized set of records, such as the subscriber/user profiles 240 stored in the database 235: For example, the database 235 may include a directory that includes an alphabetical list of persons and organizations and their associated address, email address, phone number, and or other identifier. A directory of hierarchical information can be represented a tree of directory entries. An entry consists of a set of attributes. An attribute has a name (an attribute type or attribute description) and one or more values. Each entry has a unique identifier. A client (in this case one of the subscribers 210, 215) may start an LDAP session by connecting to an LDAP server (not shown in FIG. 1). The client then sends an operation request to the server and the server sends responses in return. Exemplary operations that can be performed by the client include starting a secure connection, authenticating and specifying an LDAP protocol version, searching for and/or retrieving directory entries, testing whether a named entry contains a given attribute value, adding a new entry, deleting an entry, modifying an entry, moving or renaming an entry, aborting a previous request, and closing the connection. Authorized personnel can therefore configure and/or modify the databases 225, 235, 242 by sending requests to the alert services portal 205 to perform the requested modification.

Although the databases 225, 235, 242 are depicted as integral parts of the portal 205 in FIG. 2, persons of ordinary skill in the art having benefit of the present disclosure should appreciate that in alternative embodiments one or more of the databases 225, 235, 242 may be implemented outside of the portal 205. For example, third-party servers such as cloud servers may be used to store the information in the databases 225, 235, 242. However, in embodiments that implement the databases 225, 235, 242 outside of the portal 205, entities other than the portal 205 should not be able to access the information in the databases 225, 235, 242 without permission from the portal 205, e.g., to gather user identifiers that could be used to transmit spam to the associated users. Various authentication schemes may therefore be used to support secure communication between the portal 205 and off-site databases.

The alert services portal 205 also includes a controller 245 that includes one or more processing elements and/or memory elements that can be used to implement alert service messaging functionality. In one embodiment, the controller 245 and the alert services portal 205 support both manually generated and machine generated alerts. To send a manual alert, subscriber 210 logs into the alert services portal 205 by sending a request with authentication information (such as username and password) to the controller 245. The controller 245 can then verify or authenticate the subscriber 210 using information stored in the profiles 240. Once the subscriber 210 has been authenticated, the controller 245 may permit access to an interface such as a webpage so that the subscriber 210 can navigate to the page to manually generate an alert. The subscriber 210 may then select one or more Service/Groups from their list of services/groups, enter a text message to send, add one or more attachments, and then confirm the contents of the alert message. In one embodiment, when sending a manual alert, subscriber 210 may also choose to retrieve a list of usernames of users registered to receive alerts for a given ServiceID/GroupID. This functionality may be useful for providing personal alerting services, e.g. the sender can choose who to include from a group of friends registered to receive alerts. As discussed herein, the subscriber 210 only knows the username of the user and not the user identifier assigned by the alert service portal 205. If the alert is a machine-generated alert, e.g., an alert message sent by a Traffic Alerting service, the alert may be automatically sent to the alert service portal 205 via a RESTful API that includes the ServiceID/GroupID of the service, the username and password associated with the ServiceID, a text message, and any optional attachments. Since third-party service providers such as the subscriber 210 only know the ServiceID/GroupID and do not know the user identifiers assigned by the alert service portal 205, third-party service providers are not able to bypass the alert service portal 205 and send users spam. Users therefore only receive alerts they have subscribed to and they can disable alert services at any time.

To process an alert, the controller 245 may use the service/group identifier in the alert message request to access the corresponding service profile 230 in the database 225. The controller 245 may then retrieve the list of usernames for the service/group and use information in the user profiles 240 to generate the user identifiers associated with each of the usernames in the list. For example, the controller 245 may access the service-to-user map 244 associated with the service/group identifier and then use pointers in the map 244 to select the appropriate user profiles 240. The controller 245 can also look up the user preferences listed in the user profiles 240 and then send the alert message to the users based on the preferences/capabilities specified for a given device. For example, multi-media messages may be stripped of any attachments for text-only devices, text messages may be converted to audio via text-to-speech conversion for audio-only devices, audio messages may be converted to text via speech recognition, and the like. In the illustrated embodiment, the alert service portal 205 includes formatter/converter functionality 250 that can be used to implement the formatting and/or conversions specified by the user preferences. Alternatively, the formatting and/or conversion functionality may be implemented using third-party software that may or may not be integrated within the alert service portal 205. The controller 245 may also act as a gatekeeper and decline to send messages if time-of-day restrictions (or other restrictions or limitations) apply for one or more of the users. In one embodiment, the declined messages may be queued for later transmission when the time of day (or other) restrictions do not apply. In one embodiment, e-mail alerts may be sent via standard e-mail and other alerts may be sent via IMS. For example, when the controller 245 processes an alert, it may generate a SIP INVITE for the specific destination address and alerting method. The SIP messages may then be processed by an IMS Core Network (not shown in FIG. 2).

FIG. 4 conceptually illustrates one exemplary embodiment of an alert message service that can be provided to subscribers associated with the Naperville North High School. In the illustrated embodiment, a user (such as the school principal or other authorized official) registers with an alert message service portal as a sender and creates the service 400, which is given the service name "Naperville North High School, Naperville, IL". The alert message service portal confirms that the requested name unique (at least among the names associated with services supported by the portal) and then the portal creates and assigns the ServiceID 1234 to this service. The service administrator may create sub-groups for each of the school's sports teams. For example, a subgroup 405 that is created for Girl's Softball is assigned the ServiceID 1234-45. The Administrator then chooses to create additional sub-groups 410, 415, 420, 425 for coaches, varsity, JV and freshman girl's softball teams, respectively. The subgroups 410, 415, 420, 425 are assigned ServiceIDs 1234-45-01, 1234-45-02, 1234-45-03, 1234-45-04 respectively.

Naperville North parents, students, faculty, administrators, and other interested parties may then be informed that the alert message service is available. For example, e-mails may be sent to an appropriate Naperville North distribution list and the e-mails may include a link to the alert message service portal. People who receive e-mails may register as receivers of the alert message service and the receivers may specify the device addresses and/or e-mail addresses at which they wish to receive alerts. The receivers may also specify the capabilities of each device (e.g., audio-only, text, multi-media) and any time-of-day, location, and/or user restrictions for the alert messages. Receivers may also register to receive alerts by selecting the Service(s)/Group(s) they are interested in from the list of publically advertised Services/Groups. For example, a parent of one girl on the Naperville North High School Varsity Girl's Softball team and another girl on the Naperville North High School Freshman Girl's Softball team may register to receive alerts associated with Girls Softball, the Varsity team, and the Frosh team. In the illustrated embodiment, the parent registers addresses/phone numbers associated with a smart phone 430 and a laptop computer 435. The parent may specify that alert messages should be delivered to the smart phone 430 as audio or multimedia messages between the hours of 6 AM and 10 PM (as indicated by the dashed lines). The parent may also specify that alert messages should be delivered as e-mails to the laptop computer 435 between the hours of 10 PM and 6 AM (as indicated by the solid lines). The preferences can be modified by logging into the portal with the parents user name and password.

The administrator (or other authorized sender) can then log into the alert services portal using their username and password when they wish to send an alert message. For example, the administrator may need to manually send a message informing subscribers to the NapervilleNorth-GirlsSofball-Varsity group 410 that the home Varsity game to be played that afternoon has been moved will be played at Wheaton North instead. The administrator can create the message by navigating to a "Generate Alert" page on the website provided by the portal. The administrator can select NapervilleNorth-GirlsSoftball-Varsity from a drop-down menu of services/groups owned by the administrator, type a message into the text box, and upload a map to the Wheaton field. A SEND button can then be used to send the alert message, perhaps after confirming that the contents of the message are correct. The portal can then send the alert message to registered subscribers based on their alerting preferences. For example, the portal may be able to provide the alert message in formats including, but not limited to, a text message only with no attachment, an audio message via text to speech conversion, a multi-media message with attachment, or an e-mail. The registered parents may then receive a text message on their cell phone that the game is to be played at Wheaton North, as well as an e-mail message with an attached map to Wheaton North.

Figure 5:
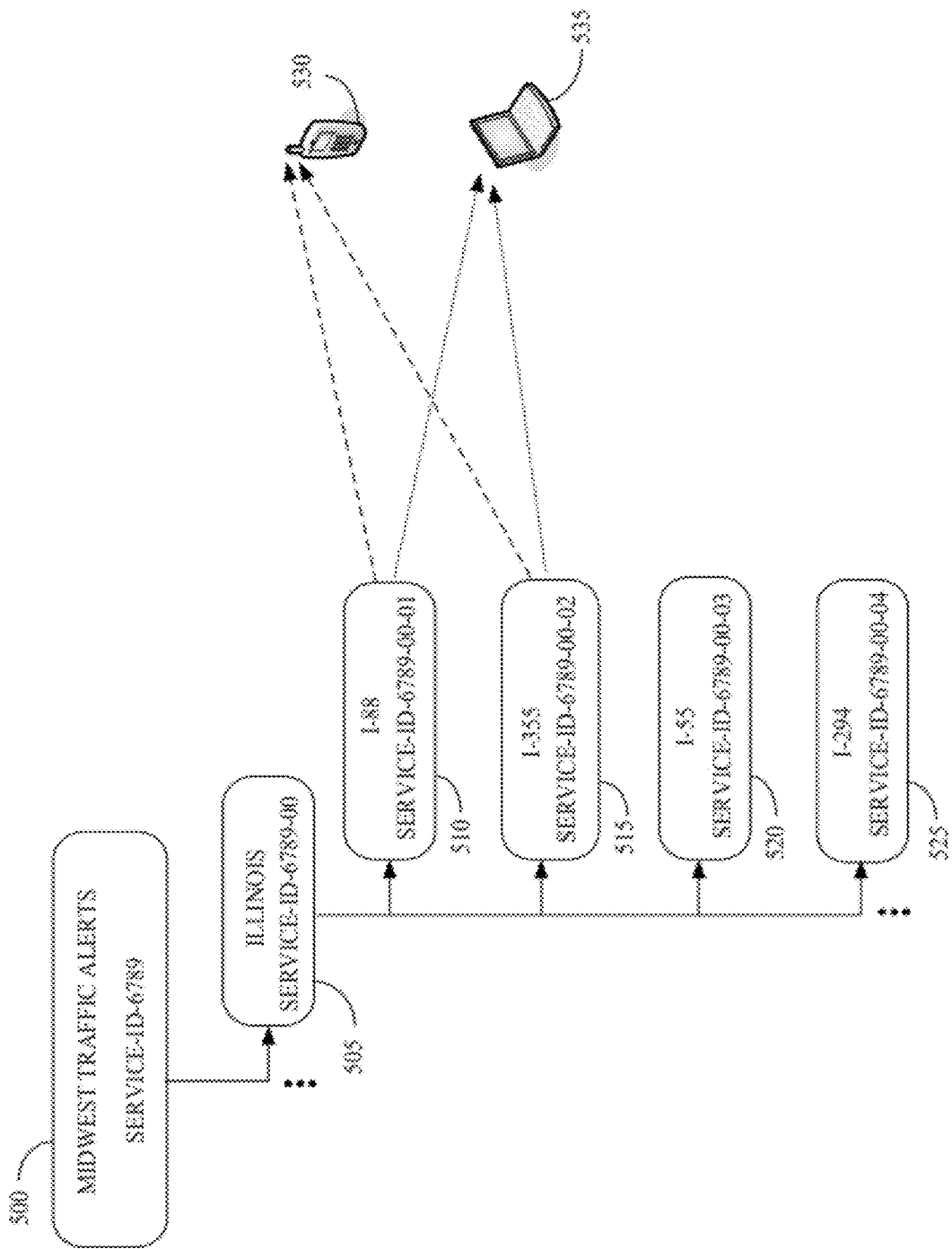
FIG. 5 conceptually illustrates one exemplary embodiment of an alert message service that can be provided to subscribers to a traffic alert service.

FIG. 5 conceptually illustrates one exemplary embodiment of an alert message service that can be provided to subscribers associated with a traffic alert service. In the illustrated embodiment, an authorized person registers themselves (or their organization) with an alert service portal. The authorized person may then create a traffic alerting service 500 and request the service name "Mid-West Traffic Alerts." If the portal verifies that the requested name is unique (at least within the portal), the portal allocates the requested service name and assigns a service identifier to the service. The authorized person may create groups for the states in the Mid-West and under each state the authorized person may create another group or subgroup for each major highway. Additional sub-groups may be associated with the highway groups, e.g. subgroups may be created for the various cities and towns the highway passes through or for intersecting roadways or thoroughfares. In the illustrated embodiment, the authorized person has created a group 505 for the state of Illinois and subgroups 510, 515, 520, 525 for the highways I-88, I-355, I-55, and I-294, respectively. In alternative embodiments, other groups/subgroups may be created for other states and highways.

People may see advertisements for this service on the internet, on billboards along the highways, and in other media and consequently they may surf to a website maintained by the alert services portal to subscribe to the traffic alerting service. Each person may register as a receiver and specify their alerting preferences. They may then subscribe to the particular traffic group/groups of interest to them. Their selections and/or preferences can be updated and/or modified at any time. In the illustrated embodiment, a user in Illinois has a smart phone 530 and a laptop computer 535. This user often commutes on the highways I-88 and I-355 and so this user registers for the traffic alert messages associated with the subgroups 510, 515. The user usually checks e-mail on their laptop 535 at home before leaving for work and so the user sets a preference to indicate that they would like to receive traffic alert messages on the laptop 535 between the hours of midnight and 8 AM. The user also typically checks for phone messages, text messages, and/or e-mail on their smart phone 530 before leaving work at the end of the day and so the user may set a preference to receive traffic alert messages on the smart phone 530 between noon and 5 PM.

In the illustrated embodiment, traffic conditions are monitored by a service provider, which can generate traffic alerts and send them to the portal, e.g., via a RESTful API. The service provider may specify the Service/Group that should receive the alert. The alert message portal may then authenticate the request and look up the user identifiers of the users registered to receive alerts for the Service/Group. The portal may then process the alert based on each subscriber's alerting preferences, generate the alert, and send the alert to the subscribers in the appropriate formats. For example, the portal may send an audio alert to the smart phone 530 to notify the user of a multi-car collision involving a truck carrying hazardous waste on I-88 at 7 AM in the morning. The user can retrieve the alert message and make alternate travel plans before leaving.

Embodiments of the alert message portal described herein may provide a number of advantages over conventional messaging systems. For example, third parties can easily create alerting services to send valuable and/or timely information such as traffic updates, emergency broadcasts, meeting changes, game changes or even social events. The portal can then customize the alert message according to how the receiver wants to receive the information (audio-alert, text-alert, email, etc. and specific device addresses). Since the alert message portal handles the formatting and/or conversion, third parties do not have to keep track of all the user data and do not have to know the details of IMS. Likewise, users can control what alerts they receive and how and when they receive them via a single username and password. For example, if the users phone number or e-mail changes, they can log into the portal to update their information instead of having to notify numerous keepers of e-mail/phone lists. Furthermore, the alert service portal provides additional security to both senders and receivers, e.g., by acting as a gatekeeper or filter to prevent spam or other unauthorized or unwanted communication. The alert service portal also simplifies the process of creating an alerting service and sending an alert. The portal gives the user the ability to control their alerting destination and preferences via a single identifier maintained on the portal instead of having the data kept by the sender. This design allows the user to choose what services/groups they want to subscribe to and prevents services from sharing lists with other service providers since the service is not aware of the user's user identifier or alerting information Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method of operating a communication portal, the method comprising:
    accessing, at the communication portal, an alert message addressed to a group registered to receive an alert service;
    generating, at the communication portal, user identifiers corresponding to users that are registered to the group, wherein the user identifiers are assigned to the users for use within the communication portal, and wherein the user identifiers are not communicated outside the communication portal to the users or a provider of the alert service; and
    transmitting the alert message from the communication portal to the users indicated by the user identifiers.

2. The method of claim 1, wherein accessing the alert message addressed to the group comprises accessing an alert message addressed to a subgroup that includes a subset of the users that are registered to the subgroup, and wherein transmitting the alert message comprises transmitting the alert message to users indicated by a subset of the user identifiers for the subset of the users.

3. The method of claim 1, wherein generating the user identifiers comprises generating the user identifiers in response to authenticating at least one of the alert message or the provider of the alert service using credentials stored by the communication portal.

4. The method of claim 1, comprising accessing user profiles in a database based on the user identifiers and transmitting the alert message to each user in accordance with at least one user preference indicated in a corresponding user profile.

5. The method of claim 4, wherein accessing said at least one user preference comprises accessing at least one user preference indicating at least one address for a communication device associated with the user, a time of day for receiving the alert message at the communication device, and a location of the communication device when it can receive the alert message.

6. The method of claim 4, wherein accessing said at least one user preference comprises accessing at least one user preference indicating a format for receiving the alert message, and wherein transmitting the alert message comprises transmitting the alert message in the format indicated by said at least one user preference.

7. The method of claim 4, comprising attempting to authenticate a request from a user to modify a user profile in the database and modifying the user profile using information in the request in response to successful authentication of the request.

8. The method of claim 1, comprising assigning a user identifier to a user to in response to a registration request transmitted to the communication portal by the user, the registration request indicating a username and a password.

9. The method of claim 8, comprising registering the user to the group in response to receiving a group registration request transmitted to the communication portal by the user, and wherein the group registration request is authenticated based on the username and the password.

10. The method of claim 1, comprising establishing the alert service using information in a service creation request from the provider and providing a service identifier for the alert service to the provider so that the provider can configure the alert service using the service identifier and a password selected by the provider.

11. A method of operating a communication device, the method comprising:
    receiving an alert message at the communication device and from a communication portal, wherein the communication device is a registered member of a group that receives an alert service that provides the alert message, wherein the communication device is identified to the group by a username, and wherein the communication portal has assigned a user identifier to a user of the communication device for use within the communication portal, and wherein the communication portal transmits the alert message to the communication device based on the user identifier, and wherein the user identifier is not communicated outside the communication portal to the user or a provider of the alert service.

12. The method of claim 11, comprising selecting the username so that the alert service cannot bypass the communication portal and transmit alert messages directly to the communication device on the basis of the username.

13. The method of claim 11, comprising transmitting a registration message from the communication device to the communication portal, wherein the registration message includes the username and a password, and wherein the communication portal assigns the user identifier in response to receiving the registration message.

14. The method of claim 13, comprising transmitting a group registration message from the communication device to the communication portal, wherein the communication portal registers the username with the group in response to authenticating the communication device on the basis of the username and password.

15. The method of claim 13, comprising requesting a modification of a user profile stored in a database by the communication portal, wherein the requested modification of the user profile is performed in response to authenticating the communication device on the basis of the username and password.

16. The method of claim 15, wherein modifying the user profile comprises modifying at least one user preference indicating at least one address for a communication device associated with the user, a time of day for receiving the alert message at the communication device, and a location of the communication device when it can receive the alert message.

17. The method of claim 15, wherein modifying the user profile comprises modifying at least one user preference indicating a format for receiving the alert message, and wherein transmitting the alert message comprises transmitting the alert message in the format indicated by said at least one user preference.

18. The method of claim 15, wherein receiving the alert message comprises receiving the alert message formed in accordance with the user profile.

19. A method of operating a first communication device, the method comprising:
providing an alert message from the first communication device and to a communication portal, wherein the alert message is directed to users that are members of a group that receives an alert service, wherein the users are identified to the group by corresponding usernames, and wherein the communication portal has assigned a user identifier to each username for use within the communication portal so that the user identifiers are not communicated outside the communication portal to the first communication device or at least one second communication device, and wherein the communication portal transmits the alert message to the at least one second communication device based on at least one of the user identifiers.

20. The method of claim 19, wherein the username is selected so that the alert service cannot bypass the communication portal and transmit alert messages directly to said at least one second communication device on the basis of the username.

21. The method of claim 19, comprising providing a service registration message from the first communication device to the communication portal, wherein the service registration message includes a service name and password.

22. The method of claim 21, comprising providing a service creation message from the first communication device to the communication portal, and wherein the communication portal creates the alert service in response to authenticating the service creation message on the basis of the service name and password.

* * * * *